UNITED STATES PATENT OFFICE.

ERNST PFITZER, OF HEIDELBERG, GERMANY.

PROCESS OF PRESERVING FLOWERS, LEAVES, &c.

SPECIFICATION forming part of Letters Patent No. 547,227, dated October 1, 1895.

Application filed September 21, 1892. Serial No. 446,464. (Specimens.) Patented in Germany October 2, 1888, No. 48,755, October 4, 1890, No. 57,630, and January 16, 1891, No. 59,225; in England July 5, 1890, No. 10,440; in Belgium December 24, 1890, No. 93,221; in France December 27, 1890, No. 210,454, and in Austria-Hungary March 26, 1892, No. 42 and No. 889.

*To all whom it may concern:*

Be it known that I, ERNST PFITZER, professor and doctor of philosophy, a subject of the Emperor of Germany, residing at Heidelberg, in the Grand Duchy of Baden, German Empire, have invented new and useful Improvements in Preserving Blossoms, Flowers, and other Delicate Parts of Plants, (for which I have obtained patents in Germany, No. 48,755, dated October 2, 1888; No. 57,630, dated October 4, 1890, and No. 59,225, dated January 16, 1891; in Great Britain, No. 10,440, dated July 5, 1890; in Belgium, No. 93,221, dated December 24, 1890; in France, No. 210,454, dated December 27, 1890, and in Austria-Hungary, Nos. 42 and 889, dated March 26, 1892,) of which the following is a specification.

My invention relates, essentially, to a process for preserving the delicate parts of plants—such as blossoms, flowers, and leaves—by replacing the water contained therein by substances imparting a sufficient rigidity to the cell-membranes to prevent collapse after the death of the cells, and to impart flexibility and a natural appearance to the preserved parts.

In carrying out my invention I first replace the water contained in the plant parts by a substance adapted to render the cell-membranes rigid.

The following substances possess this property, to wit: first, the monatomic alcohols, as methyl, ethyl, isobutyl, and amyl-alcohol; second, the ethers, aldehydes, and ketones of the monatomic alcohols; third, the hydrocarbons of the paraffine, olefine, and terpene series, and particularly the petroleum hydrocarbons; fourth, the halogen and nitro derivatives of the hydrocarbons of the paraffine, &c., series just mentioned, particularly chloroform, carbon tetrachloride, and sulphide of carbon; fifth, the monatomic acids of the fatty series, particularly those of the higher series, also, oleic, ricino leic, and linoleic acids; sixth, benzol, toluol, xylol, and other benzol hydrocarbons and their halogen and nitro derivatives, also the aromatic alcohols and aldehydes.

The plant parts to be preserved are immersed in the liquid and allowed to remain a sufficient time to insure the expulsion of the water and its replacement by the liquid. This step of the process may be facilitated by producing a vacuum in the vessel when the liquid—such, for instance, as ethyl-alcohol—can be mixed with water in any desired proportion. To prevent the plant parts from turning brown during this step of the process and also to retard the dissolution of the natural coloring-matter, I add mineral acids—such, for instance, as sulphurous acid—to the liquid, and also such substances of the series one to six, above set forth, which mix less readily with water. Of these amyl-alcohol, ether, especially acetic ether, are very effective. If the liquid with which the plant part is to be impregnated cannot be mixed with water to any considerable extent, either ethyl-alcohol, acetone, or similar substances, of the series one to six, which can be mixed with water in any desired proportion, are added, or the draining of the plant parts may be assisted by adding hygroscopic substances. A small quantity of the hygroscopic substance, say chloride of zinc, is dissolved in the liquid with which the plant parts are to be impregnated. In place of a soluble hygroscopic substance a hygroscopic substance insoluble, or only slightly soluble, in the liquid may be used. In either case the hygroscopic substance withdraws from the liquid the water extracted from the plant parts and thus enable the liquid to reabsorb water from the plant parts.

If the plant parts are to be impregnated with a liquid which will mix with water only in a slight degree, the plant parts may first be impregnated with ethyl alcohol and then with the desired liquid. When two or more liquids are used in succession, care must be taken that each is capable of completely mixing with the preceding liquid; and the parts must also be impregnated with anhydrous alcohol before they are immersed in a liquid capable of being mixed with alcohol, but not with water, in order that no water may remain therein. To the liquid last employed, which may be the only liquid that has been used, as in the case of ethyl alcohol, are added substances adapted to preserve or increase the natural appearance of the plant parts after drying and capable of imparting thereto, if desired, a greater durability and flexibility. These admixtures should be soluble to a sufficient degree in the liquid originally used. Particularly suitable for this purpose are the vegetable and animal fats, wax, solid paraffine, spermaceti, rasins, distilled oils, fixed fatty acids, coloring-matters, hygroscopic and antiseptic substances, and small quantities of acids and alkalies.

In treating coarse green leaves, aqueous solutions of hygroscopic salts, such as the chlorides of magnesium, calcium, zinc, and acetate of potassium may be used. In all other cases the substances used for preserving are to be selected from the list of fats, &c., above given, or from the series one to six previously referred to.

The plant parts, after completion of the second step in the process, are dried either in the open air or in the presence of hygroscopic substances, such as chloride of calcium or sulphuric acid. When the last or only liquid used did not contain any or only small quantities of hygroscopic liquid, or in treating coarse leaves, the first method of drying is adopted, while when the contrary is true the second method is followed.

In order to enable others to carry out my invention, I will now proceed to describe in detail the method involved, assuming, first, that the more delicate parts, such as blossoms or flowers, are to be treated.

The flowers are immersed in pure ninety-five per cent. alcohol, to which has previously been mixed sulphurous acid. They are allowed to remain in this mixture for about twenty-four hours. To prevent the possibility of a subsequent formation of sulphuric acid, the flowers may then be placed in pure alcohol in the presence of witherite (carbonate of barium) for an additional twenty-four hours. I then prepare a solution, consisting of four parts alcohol, one part castor-oil, and one part turpentine, to which may be added an aniline color or dye corresponding to the natural color of the flowers. Of course when the flowers are white all coloring-matter is omitted. The flowers are placed in this solution and permitted to remain therein for about twenty-four hours. They are then dried, preferably in a closed vessel in the presence of chloride of calcium, in which vessel they are permitted to remain for another period of about twenty-four hours.

The proportions of the solution, as well as the lengths of time for which the plants are exposed in the several steps, will be varied according to the nature of the flowers.

The less delicate parts of plants, such as the coarser leaves, are first placed in either an aqueous or alcoholic solution of chloride of magnesium and permitted to remain therein for a period of from one to three weeks, according to the nature of the leaves and then dried in the open air. They are then dyed by dipping into any usual coloring-matter and dried. If desired, a little glycerine and dissolved shellac may be added to the chloride of magnesium solution.

For delicate leaves, ferns, mosses, &c., a little sulphuric ether may be added to the alcoholic solution.

What I claim as new, and desire to secure by Letters Patent, is—

The herein described process for preserving natural flowers, leaves, &c., consisting in replacing the water contained therein by alcohol containing a mineral acid such as sulphurous acid, impregnating the flowers, &c., with a preservative fluid, such as a solution of castor oil and turpentine in alcohol, and finally drying.

In testimony whereof I have signed my name to this specification in the presence of two subscribing witnesses.

ERNST PFITZER.

Witnesses:
FERD. BOPP,
M. LENPLNER.